(12) United States Patent
Price

(10) Patent No.: US 10,959,402 B2
(45) Date of Patent: Mar. 30, 2021

(54) ANIMAL FEEDING CONTAINER AND METHOD OF USING

(71) Applicant: David H. Price, Knoxville, TN (US)

(72) Inventor: David H. Price, Knoxville, TN (US)

(73) Assignee: Tidy Dog Pet Products Co., Knoxville, TN (US)

( * ) Notice: Subject to any disclaimer, the term of this patent is extended or adjusted under 35 U.S.C. 154(b) by 294 days.

(21) Appl. No.: 15/998,011

(22) Filed: Jun. 8, 2018

(65) Prior Publication Data

US 2019/0373851 A1 Dec. 12, 2019

(51) Int. Cl.
*A01K 5/01* (2006.01)
*A01K 7/00* (2006.01)

(52) U.S. Cl.
CPC ............ *A01K 5/0135* (2013.01); *A01K 7/005* (2013.01)

(58) Field of Classification Search
CPC ...... A01K 5/0135; A01K 5/01; A01K 5/0114; A01K 7/005; A01K 5/0121; A01K 5/0142
See application file for complete search history.

(56) References Cited

U.S. PATENT DOCUMENTS

| | | | |
|---|---|---|---|
| D180,329 S | 5/1957 | Highberger | |
| 3,009,599 A | 11/1961 | Schier et al. | |
| 3,611,998 A * | 10/1971 | Loscalzo | A01K 5/0114 119/61.54 |
| 3,722,476 A * | 3/1973 | Van Ness | A01K 5/0114 119/61.54 |
| 3,810,446 A * | 5/1974 | Kightlinger | A01K 5/0135 119/61.55 |
| 4,886,016 A * | 12/1989 | Atchley | A01K 5/0135 119/61.54 |
| 5,144,912 A * | 9/1992 | Hammett | A01K 5/01 119/51.5 |
| 5,285,749 A * | 2/1994 | Byer | A01K 5/0142 119/61.53 |
| 6,330,956 B1 * | 12/2001 | Willinger | A01K 5/0114 220/574 |
| 6,401,954 B1 * | 6/2002 | Gamble | A01K 5/0114 206/547 |
| D467,687 S | 12/2002 | Tangolics | |
| 6,516,747 B1 * | 2/2003 | Willinger | A01K 5/0114 119/61.54 |
| 6,619,230 B1 * | 9/2003 | Kimbrough | A01K 5/0114 119/61.56 |
| D607,616 S | 1/2010 | Newsome et al. | |
| D657,628 S | 4/2012 | Sink et al. | |

(Continued)

*Primary Examiner* — Trinh T Nguyen
(74) *Attorney, Agent, or Firm* — Robert J. Lauf

(57) ABSTRACT

A container for holding food or water for an animal includes: a unitary vessel having a generally oval plan and a trough in the upper surface to contain material for consumption by an animal, and further including: a flat rim on the lower surface to allow the vessel to rest stably on a horizontal surface; generally vertical outer sides that slope outwardly from the upper surface to the lower surface at a selected angle from the vertical; and, a cantilevered handle extending from the upper surface in a direction along the major axis of the oval and having sufficient dimensions and sufficient strength to support the weight of the vessel and its contents; and wherein, the inner surface of the trough slopes inwardly from the upper rim of the trough to the bottom of the trough at a selected angle from the vertical.

A related method is also disclosed.

10 Claims, 11 Drawing Sheets

(56) References Cited

U.S. PATENT DOCUMENTS

| | | | |
|---|---|---|---|
| D680,813 S | 4/2013 | De Leo | |
| D706,995 S | 6/2014 | Modi et al. | |
| 9,402,371 B2 * | 8/2016 | Rabideau | A01K 5/0114 |
| D781,109 S | 3/2017 | Rubino | |
| 2010/0275852 A1 * | 11/2010 | Lipscomb | A01K 5/0114 |
| | | | 119/61.5 |
| 2016/0255805 A1 * | 9/2016 | Jones | A01K 5/0114 |
| 2018/0014505 A1 * | 1/2018 | Macneil | A01K 7/005 |
| 2018/0020637 A1 * | 1/2018 | Macneil | A01K 5/0135 |
| | | | 119/61.54 |

\* cited by examiner

SECTION A-A

SECTION B-B

SECTION A-A

SECTION B-B

ANIMAL FEEDING CONTAINER AND METHOD OF USING

BACKGROUND OF THE INVENTION

Field of the Invention

The invention pertains to apparatus and methods for feeding animals, and more particularly to feeding bowls that prevent an animal's ears from coming into contact with food and water.

Description of Related Art

Food and water bowls for domestic animals, particularly dogs, are normally placed on the floor so that the animal can lap the contents conveniently. Unfortunately, veterinarians frequently treat animals for infections or irritation of the ears because they have come into contact with food and/or water.

Various accessories have been developed to address this problem, such as a knitted or flexible snood that the owner can slip over the dog's head to constrain the ears so that they don't drag in the food bowl. The problems with this approach include the fact that it requires the owner to place it on the animal at the time of feeding, and thus can't conveniently accommodate a pet that might eat or drink small amounts randomly throughout the day. It also presents a sanitation problem in its own right because the snood is likely to become soiled and must be periodically cleaned.

What is needed is a system for feeding pets that is adaptable to a wide range of animals, is easily cleaned, and prevents the animal's ears from coming into contact with food and water.

Objects and Advantages

Objects of the present invention include the following: providing a feeding bowl that prevents an animal's ears from hanging into food or water; providing a feeding bowl that works together with an animal's natural behavioral patterns when feeding or drinking; providing a feeding bowl that is easily manufactured by low-cost methods; and providing a method for feeding domestic animals that is sanitary and requires no special training of the animal. These and other objects and advantages of the invention will become apparent from consideration of the following specification, read in conjunction with the drawings.

SUMMARY OF THE INVENTION

According to one aspect of the invention, a container for holding food or water for an animal comprises:
a unitary vessel having a generally oval plan and a trough in the upper surface to contain material for consumption by an animal, and further comprising:
  a flat rim on the lower surface to rest stably on a horizontal surface;
  vertical outer sides that slope outwardly from the upper surface to the lower surface; and,
  a cantilevered handle extending from the upper surface in a direction along the major axis of the oval and having sufficient dimensions and sufficient strength to support the weight of the vessel and its contents; and wherein, the vertical inner sides of the trough slope inwardly from the upper rim of the trough to the bottom of the trough at an angle that varies around the circumference of the oval.

According to another aspect of the invention, a method for feeding an animal comprises the steps of:
  forming a trough having a generally oval shape whose minor axis is less than the distance between a selected animal's ears, and whose major axis is at least 125% of the minor axis, the trough further comprising a cantilevered handle extending from the upper rim of the trough along the long axis of the trough;
  placing material to be consumed by the animal into the trough;
  placing the trough onto a flat surface proximate to a wall with the major axis of the oval substantially perpendicular to the wall and the cantilevered handle extending in the direction away from the wall so that the animal will approach the trough from the direction of the cantilevered handle.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

The invention comprises a food or water bowl 1 that includes a trough formed in a generally oval shape, when viewed from above, and further has an integral cantilevered handle 2 extending outward from the upper surface in a direction parallel to the major axis of the oval. The inner sides of the trough slope inwardly from top to bottom, meeting the rounded bottom of the trough tangentially to eliminate corners in the bottom where food may become trapped. The outer sides of the bowl preferably slope outwardly at a selected angle $\theta_1$ relative to vertical so that the base of the oval that rests on the floor is somewhat larger than the top of the bowl, to provide greater stability. Small feet or pads 3 having a friction surface may be disposed at selected points on the bottom surface to grip the floor and minimize sliding Despite its relative simplicity of design, the inventive bowl incorporates features that Applicant has developed by a careful study of dog behavior. These features have been found to be surprisingly effective at eliminating food and water in the animal's ears, while at the same time the system is intuitively accepted by the animal because it works in concert with the animal's natural behavior, as will be shown in the examples that follow.

Example

Figure 1:
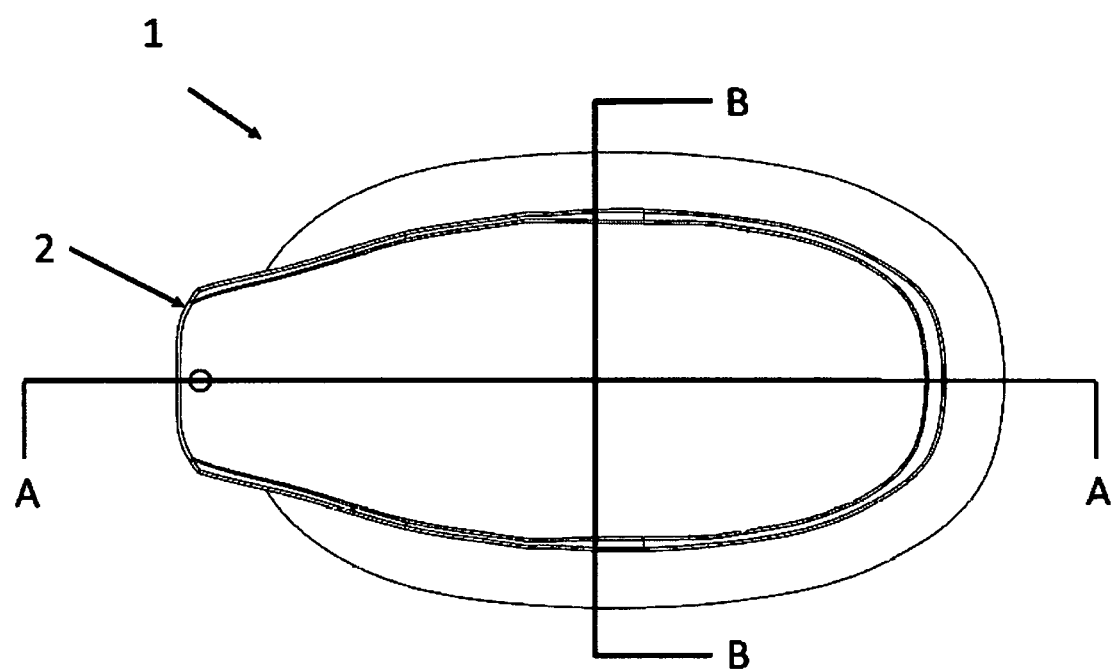
FIG. 1 is a schematic diagram of one example of the present invention, shown in plan view.

FIG. 1 shows an example of the invention, viewed from the top. In plan, the bowl is elliptical in shape; the major axis (i.e., the length along A-A) is preferably about 150-200% of the minor axis (i.e., the width along B-B), but the exact value can vary somewhat. For instance, if the animal is very large, so that a larger overall bowl is needed, the ratio might be reduced (say, to 125%) so that the bowl won't be inconveniently long. Conversely, for very small dogs, a more elongated bowl (with a ratio of at least 200%) may be preferred.

Example

The bowl 1 contains an integral or unitary handle 2, which is cantilevered outwardly on one end of the oval and extends in the direction of the major axis. The handle preferably has a convex lower surface and a concave upper surface, so that it will rest comfortably in the user's grip with the fingers under it and the thumb above it. The underside of the handle may further have a textured surface to improve the user's grip. Handle 2 serves several purposes. First, it allows the user to hold the bowl horizontally while it is full and place it on the floor without tipping. Second, the user can use the bowl as a scoop to retrieve a set amount of dry food from a large container. Third, Applicant has discovered that the handle provides another crucial function, viz., it directs the animal to approach the bowl from the end rather than from the side. Applicant has observed this behavior repeatedly, with no training or intervention from the user, and Applicant speculates that the inventive design triggers an instinctive behavior in the animal.

Example

Figure 2:
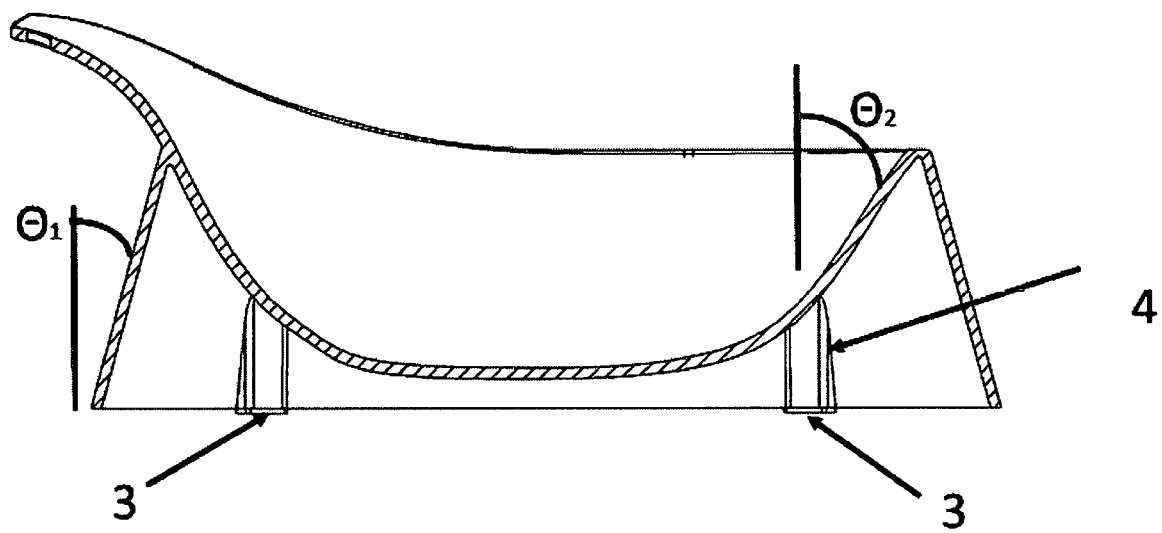
FIG. 2 is a schematic diagram of the example in FIG. 1, shown in cross section along A-A.

FIG. 2 shows a side view in cross-section along A-A of the bowl shown in FIG. 1. One can see that the outer surfaces preferably slope outwardly from top to bottom by a selected angle from the vertical $\theta_1$ to enhance the stability of the bowl by creating an expanded footprint on the floor. (As used herein, "vertical" refers to a direction normal to the plane of the flat bottom of bowl, shown as vertical lines in FIGS. 2-3 where the angles $\theta$ are indicated.) At the same time, the sides of the trough slope inwardly from top to bottom to eliminate interior corners in which food may become trapped. The bottom of the trough is concave, rather than flat, so that the contents of the bowl will gravitate toward the center as material is consumed. Also, the inwardly-sloping sides meet the concave bottom as a smooth tangent to eliminate any corners where material might collect.

Example

Figure 3:
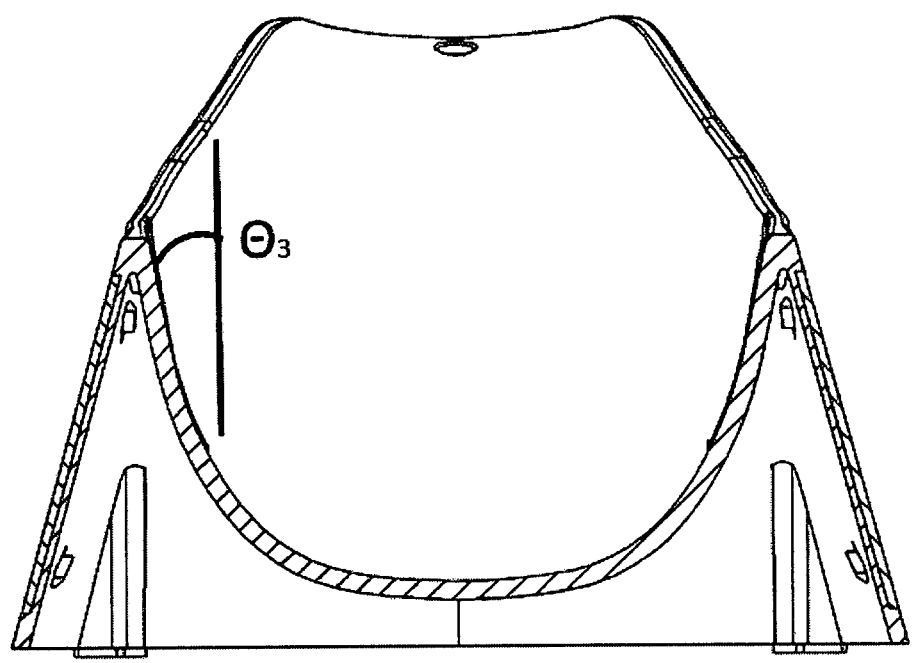
FIG. 3 is a schematic diagram of the example in FIG. 1, shown in cross section along B-B.

FIG. 3 shows an end view in cross section along B-B of the bowl shown in FIG. 1. Comparing FIGS. 2 and 3, it can be seen that in this case, the inward slope of the trough varies around the circumference of the oval, such that the inner wall is somewhat more steeply sloped $\theta_3$ on the sides of the oval and more gradually sloped $\theta_2$ on the ends of the oval. Applicant has discovered that this shape also works interactively with the animal's natural behavior, as dogs and cats tend to lap the food or water and generally push forward while doing so. Thus, the animal moves forward, consuming the food, lapping more or less parallel to the more steeply sloping side walls. As the remaining food decreases, the animal instinctively pushes it up against the more gradually sloping surface at the narrow end of the oval opposite the handle, making it easier to consume the remaining bits of food.

Example

Figure 4:
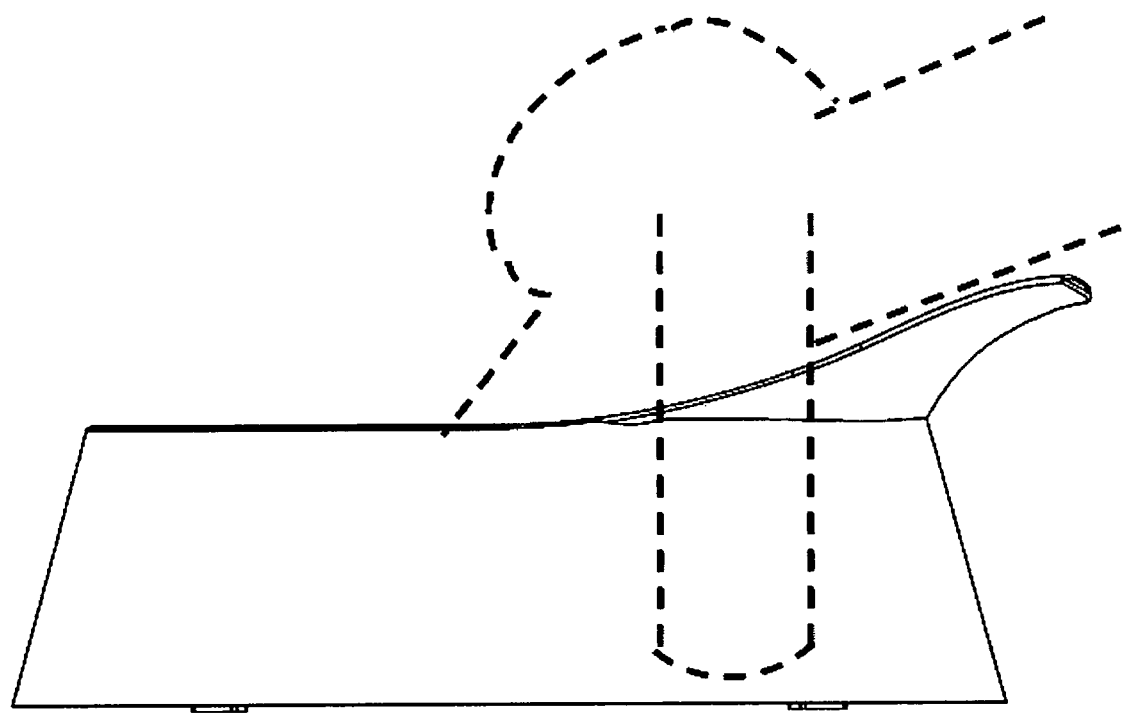
FIG. 4 is a schematic diagram of the invention in use.

It will be appreciated that the invention works, in part, because of the relationship between the size of the bowl and the size of the animal. It is important that the narrow dimension of the bowl must be less than the distance between the animal's ears, so that the ears hang down on either side of the bowl and therefore are not in contact with the contents. Thus, Applicant contemplates that the bowl will be offered in various sizes to accommodate correspondingly larger or smaller animals. A bowl sized appropriately for a particular animal will have a minor axis that is narrower than the spacing of the ears. One convenient guideline is to select a bowl that is approximately as wide (in the narrow dimension or minor axis) as the spacing of the animal's eyes. This will insure that the ears straddle the bowl and don't hang into it, as indicated by the dashed outline of the animal in FIG. 4.

Example

A bowl with the inventive design was configured for a small dog. In this case, the dog's head was about 8 cm wide, and the bowl dimensions were selected to be about 8×14 cm. The bowl was about 6 cm tall and the handle was about 5 cm long and 5 cm wide.

It will be appreciated that larger dogs will require larger bowls. Applicant contemplates that three sizes of bowls will accommodate most types of dogs. The small bowl just described holds about 12-16 fluid ounces of food or water, a medium bowl might hold about 24-28 fluid ounces, and a large bowl might hold 34-36 fluid ounces. Marks or fill lines may be formed on the inner surface, as ridges or indentations, for the convenience of the user. Corresponding indicia may be provided to indicate volumetric measures (fluid ounces, mL, or the like); alternatively one fill line for food and a second fill line for water might be provided if the ideal amounts of food and water for the same animal are different.

Example

As previously noted, the particular values of dimensions and angles $\theta_1$, $\theta_2$, and $\theta_3$, may be varied somewhat to accommodate animals of various sizes, as well as for aesthetic reasons or for considerations such as optimal draft angles for injection molding. For illustrative purposes only, FIGS. 7-10 show the dimensions of one particular example that has been found to work well. The cross-sectional views in FIGS. 9 and 10, refer to the same section lines A-A and B-B shown in FIG. 1.

The method of using the invention, as noted above, appears to trigger certain aspects of an animal's instinctive behavior. Specifically, by placing the bowl on the floor and orienting it perpendicular to a wall or other vertical surface (e.g., the front of a kitchen cabinet, appliance, etc.), Applicant has observed that the animal will quickly learn to approach it from the direction of the cantilevered handle as shown generally in FIG. 4. The exact reason for this behavior is not known with certainty; however, Applicant speculates that perhaps the animal finds it annoying to have one ear rubbing against the cantilevered handle when trying to feed from the side of the bowl instead of the end. An alternate explanation is that the animal finds it more efficient to consume the food when moving parallel to the long axis of the trough. Yet another possible explanation is that the handle makes it convenient for the owner to place the bowl perpendicular to a wall or other vertical surface, and the animal has a natural tendency to approach the bowl in the same direction so that the animal can push forward while feeding and the bowl will be supported by the wall to prevent it from moving away from the animal.

Applicant has further observed that a relatively small animal (e.g., a dachshund or toy dog) will actually straddle the bowl with its legs (not just the ears) and essentially walk forward while consuming the food therein. As noted above, this explains why a bowl configured for a smaller dog might have a larger aspect ratio (say, 200%) compared to a bowl intended for a much larger dog (say, 125%).

Example

The surprising effectiveness of the invention in preventing infections has been demonstrated by Applicant in prototype tests. A small dog (poodle) had periodically developed infections from food or water in the ears, which typically required veterinary treatment about once or twice a year. When extensive tests were done using the inventive bowl to provide food and water, the animal had no infections occur in three years of feeding. Given that the dog was fed twice a day, this represents over two thousand uses of the bowl without a single ear infection.

It will be appreciated that the bowl may be made from any convenient material and by any convenient process. The example shown in FIGS. 1-3 is designed to be made by conventional injection molding using a thermoplastic such as polyethylene, polypropylene, PTFE, etc. Dye may be added to make an injection molding of any selected color. The injection molded part may contain a substantially hollow base, as shown in the cross-sectional drawings, in order to reduce cost and eliminate unnecessary material, but that feature is not critical for the functioning of the invention as described. Other optional features may be added as described in the following examples.

Example

Figure 5:
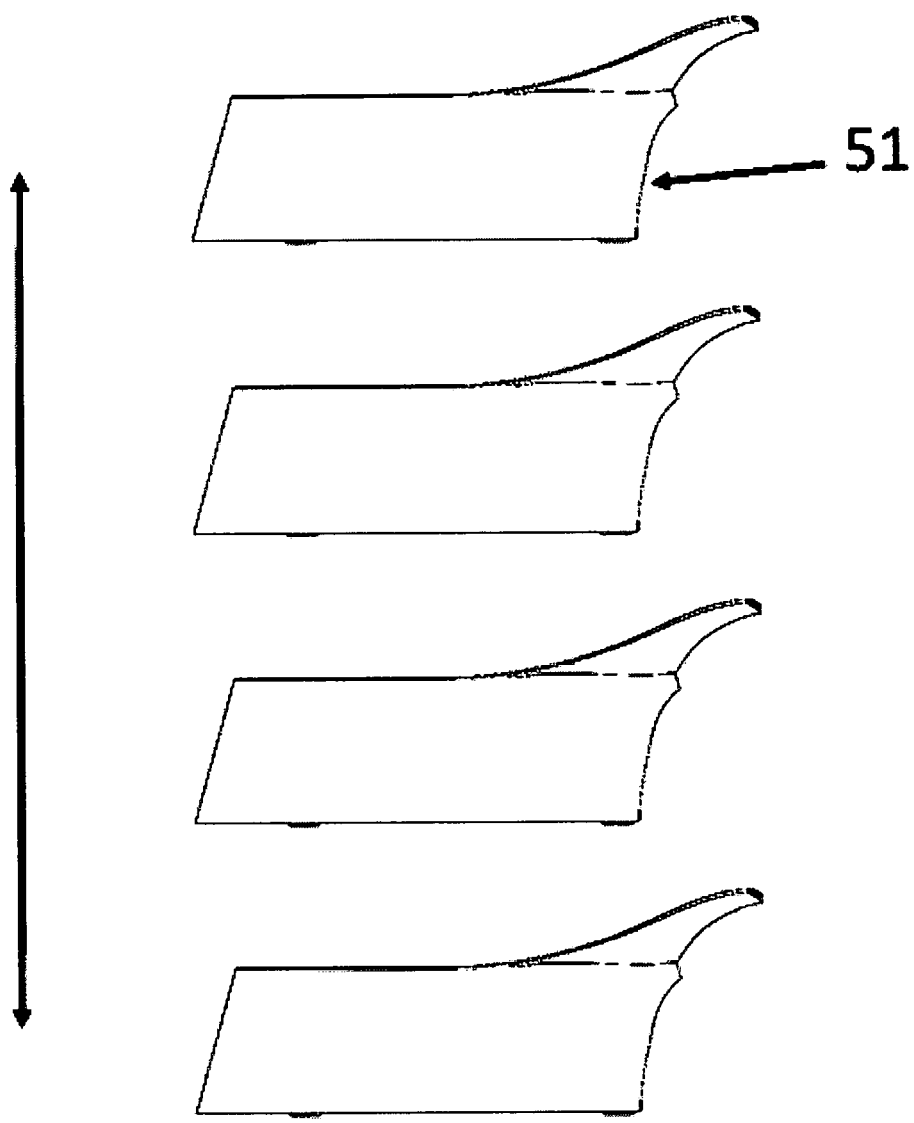
FIG. 5 is a schematic diagram of another example of the invention, configured to be stackable to reduce the volume needed for storage and shipping.

If the bowl is intended to be mass-produced and shipped a great distance, then the design can be modified as shown generally in FIG. 5; here a cutout 51 is made in the side of the outer wall on one end or the other, to allow a space for the handle to nest so that bowls may be stacked vertically (as indicated by the double arrow) to reduce the shipping volume. A small hole or hook may be formed into the cantilevered handle to allow the bowl to be hung in a point-of-sale display or when not in use by the end customer.

Example

Figure 6:
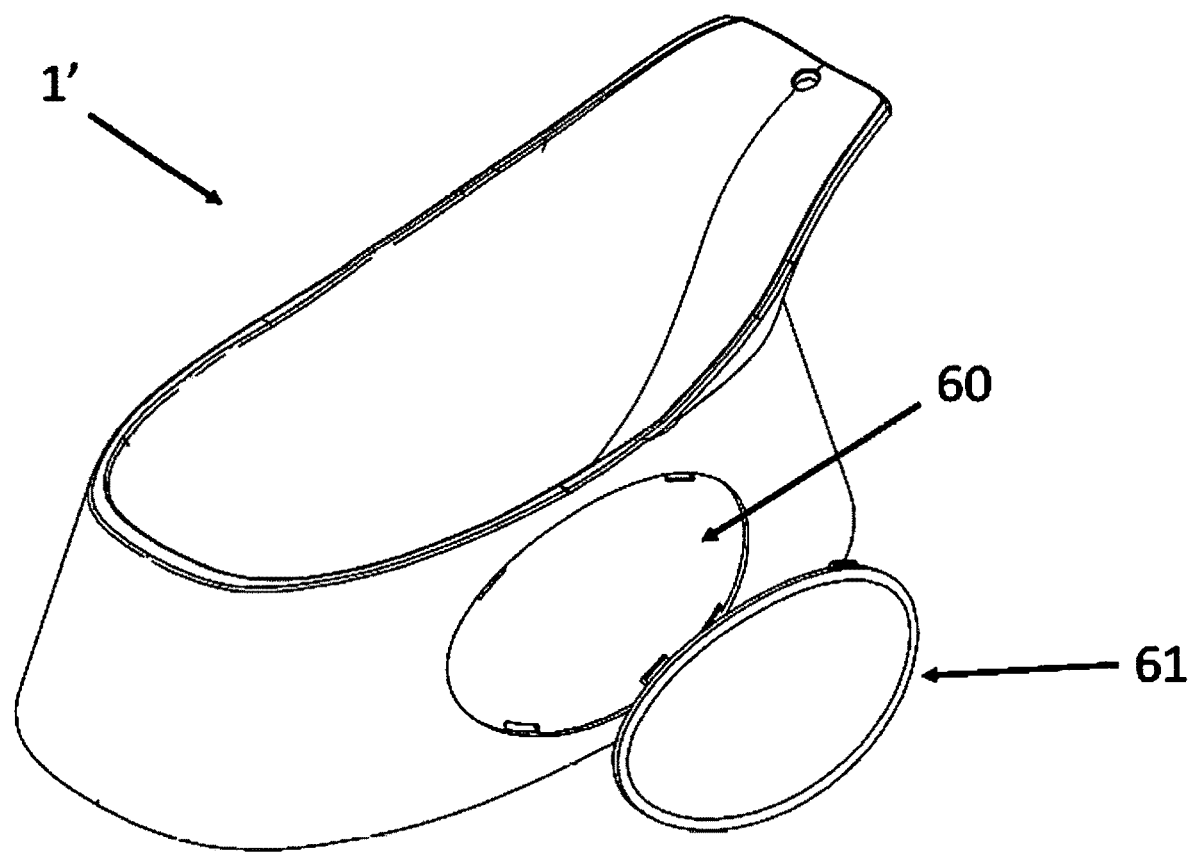
FIG. 6 is a schematic diagram of another example of the invention, configured to hold an insert for personalization or identification.
Figure 7:
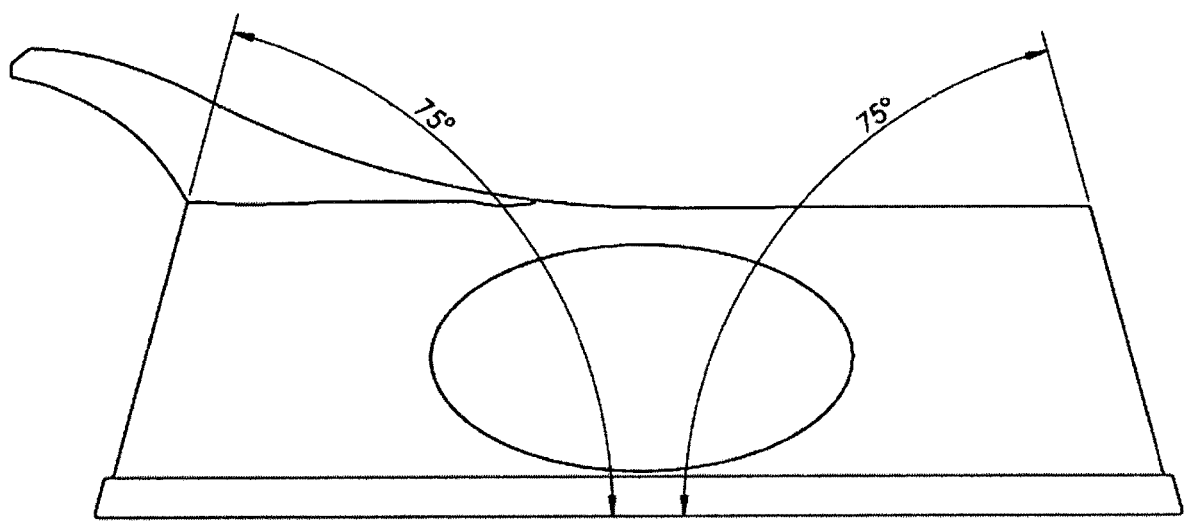
FIG. 7 is a schematic diagram of one particular example of the present invention, shown in side view.
Figure 8:
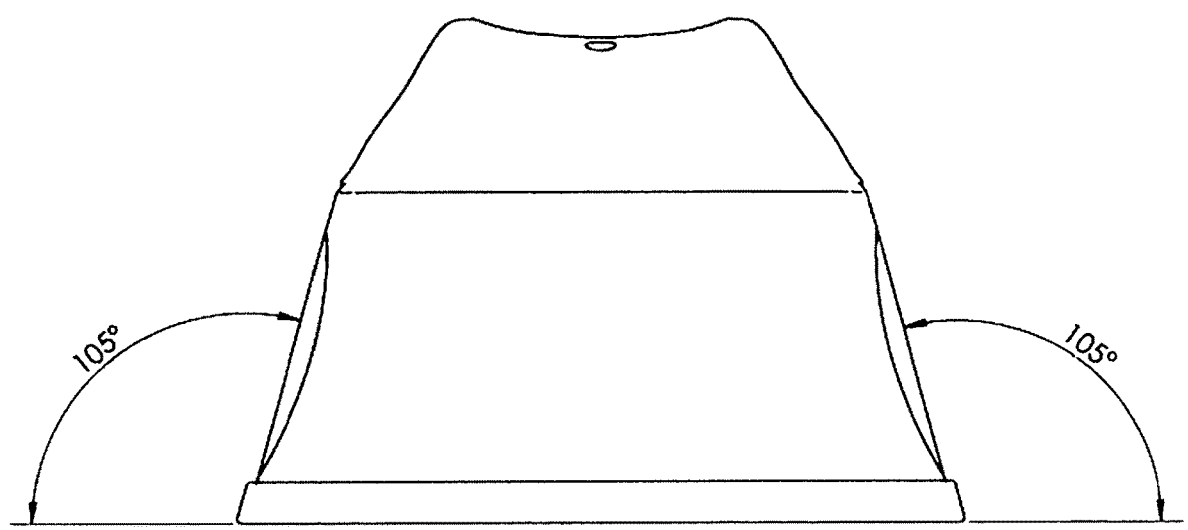
FIG. 8 is a schematic diagram of the example in FIG. 7, shown in end view.
Figure 9:
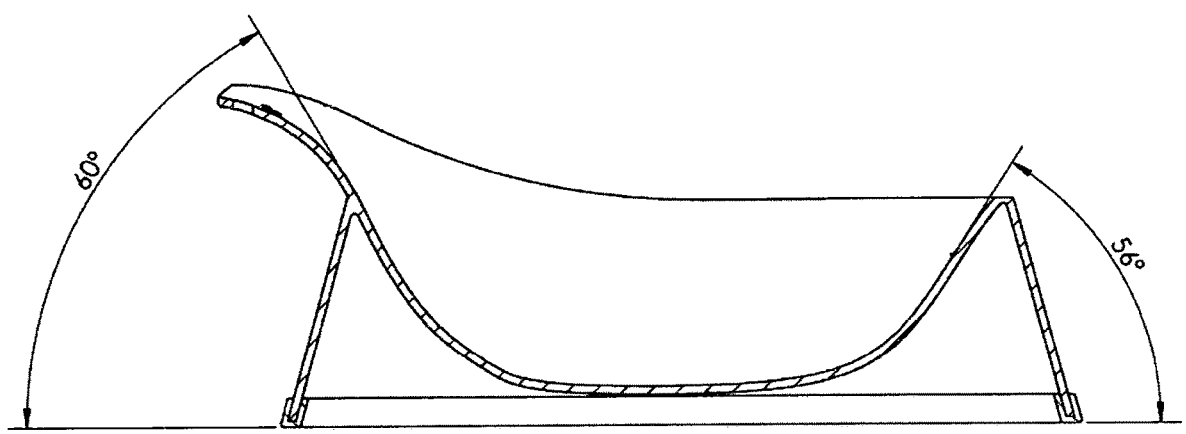
FIG. 9 is a schematic diagram of the example in FIG. 7, shown in cross section along A-A.
Figure 10:
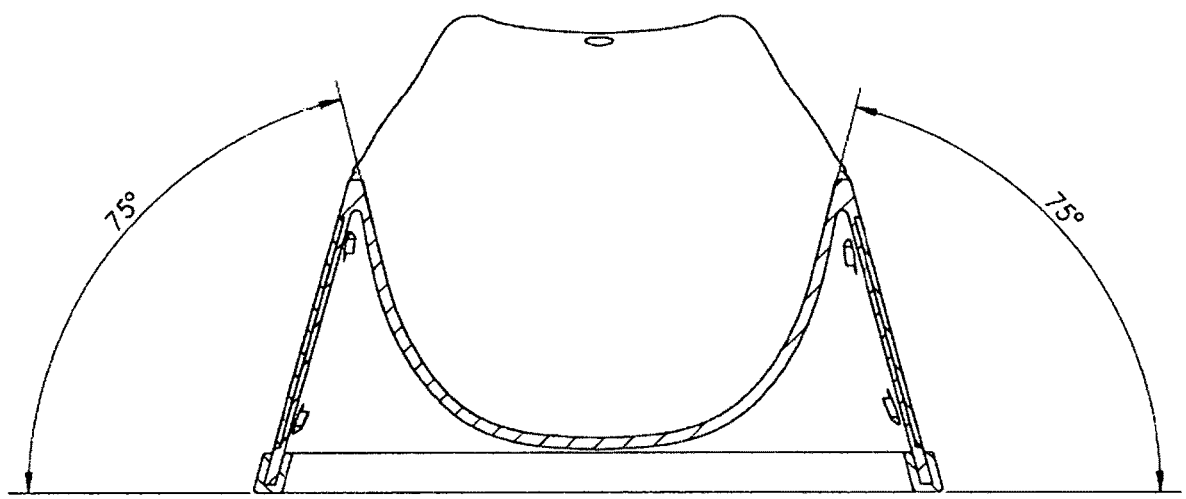
FIG. 10 is a schematic diagram of the example in FIG. 7, shown in cross section along B-B.

The bowl may contain features for personalizing the product as shown generally in FIG. 6. For example, a flat boss may be formed on one side, creating sufficient wall thickness that the pet's name or other indicia might be engraved thereupon at the point of sale. Alternatively, a raised boss (or a corresponding depression 60) may be provided that defines a frame into which a personalizing item 61 may be snapped. In this way, the pet's name may be engraved on a small plastic or metal plate, which is then snapped into the frame and held securely therein, owing to the generally elastic properties of the polymer.

Example

A further element of personalization may be added by forming snappable insert 61 from transparent plastic. The assembly defines a space or slot into which the user may insert a printed sheet, which might have the pet's name or photograph, for example. It will be appreciated that this allows the user great latitude in personalizing the bowl, because any selected image or text may be printed in any color(s) on paper or card stock and cut to size. Then, when insert 61 is snapped into place, it preferably fits completely into depression 60 and thereby protects the printed sheet from coming into contact with food or water. Alternatively, Applicant contemplates that a user may submit one or more digital files representing a drawing or photograph, the animal's name, etc., which can then be laser printed in B&W or color, on a sheet of adhesive labels that have been die cut to fit into depression 60. This sheet would then be sent to the user along with transparent insert 61. Applicant has found that white polyester weatherproof paper labels with permanent adhesive (type XW, sheetlabels.com, Glens Falls, N.Y.) are suitable for this purpose and a laser printed image thereon was found to be waterproof and well protected by insert 61.

It will be appreciated that insert 61 may be configured to easily snap out of bowl 1', either to allow the printed sheet to be changed or to remove it temporarily if bowl 1' is to be placed in a dishwasher or submerged in a sink.

Example

The personalization as described in the preceding example can also be used to associate the product with various affinity groups. For example, the bowl may be mass-produced in some neutral color (white, beige, etc.) and the snap-in inserts may be made in the colors of a particular school, military unit, or the like, or may include an idealized portrait of a particular dog breed, etc.

Example

The personalization may also be used for marketing purposes. For example, the bowl may include the name or logo of a particular brand of pet food, the name of a veterinarian, pet supply store, etc. The invention may therefore also be used as an incentive item, for example, bundled with a large bag of dog food as a free bonus.

As noted above, the bowl may include features to minimize slippage on smooth surfaces such as a vinyl or hardwood floor. The example shown in FIG. 2 includes small bosses 4 on the underside to accommodate non-slip rubber feet 3 as are well known in the art. Alternatively, the bosses may be eliminated and instead several short segments of slit rubber or plastic tubing having appropriate mechanical and friction characteristics may be slipped onto the lower edge of the bowl to perform the same function.

Example

Figure 11:
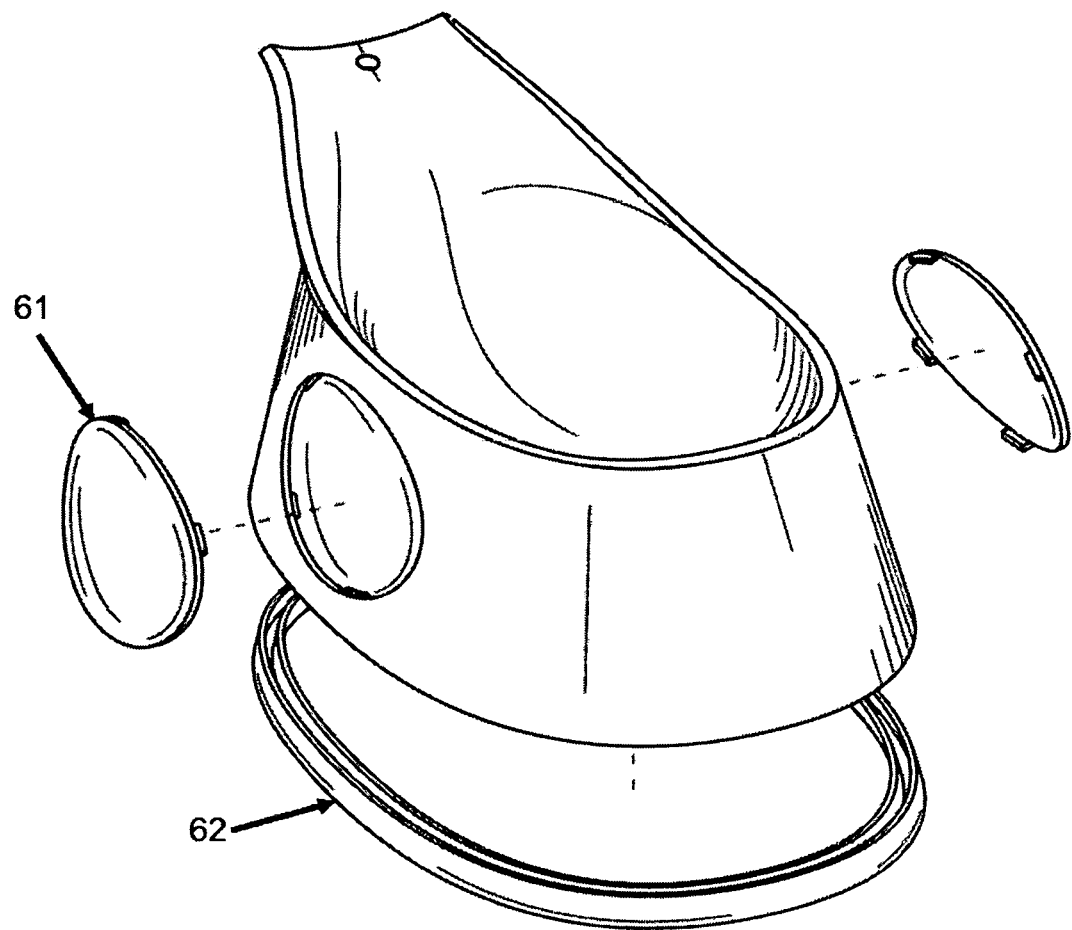
FIG. 11 is an exploded view of another example of the invention, showing snappable inserts on each side and a rubber U-ring on the bottom to inhibit sliding.

Applicant has found that one particularly effective way to inhibit slippage is to form a silicone rubber U-ring 62 that snaps onto the entire periphery of the bottom edge of the bowl as shown generally in the exploded view of FIG. 11. One suitable material is a compression molded silicone rubber, having durometer hardness approximately 50 (Shore A scale).

Small holes may further be provided at selected points near the top of the outer wall to allow for drainage when the bowl is placed face-down in a dishwasher for cleaning. In the case described above in which a cutout is provided to allow for compact stacking, the cutout may be configured to serve the same purpose of draining in the dishwasher.

It will be further appreciated that very deep-chested dogs can benefit from food and water bowls that are elevated some distance above the ground. The invention may therefore include a supporting structure into which one or more bowls may be disposed. The supporting structure preferably holds the bowls parallel to one another with adequate spaces on both sides of each bowl for the animal's ears to hang down without contacting the contents of one bowl while using the other. The supporting structure preferably allows each bowl to be removed easily for cleaning, refilling, etc., and the structure itself is preferably configured for easy cleaning as well. The structure may be constructed of any convenient material (metal, wood, plastic, etc.) and manufactured by any convenient means.

The following summary is intended to illustrate several exemplary ranges, variants, modifications, and optional features and designs that may be incorporated in the invention.

A container for holding food or water for an animal may comprise:

a unitary vessel having a generally oval plan and a trough in the upper surface to contain material for consumption by an animal, and further comprising:

a flat rim on the lower surface to rest stably on a horizontal surface;

generally vertical outer sides that slope outwardly from the upper surface to the lower surface at a selected angle from the vertical; and, a cantilevered handle extending from the upper surface in a direction along the long axis of the oval and having sufficient dimensions and sufficient strength to support the weight of the vessel and its contents; and wherein, the inner sides of the trough slope inwardly from the upper rim of the trough to the bottom of the trough at a selected angle from the vertical.

The oval shape of the bowl may have an aspect ratio ranging from about 125% to about 200%.

The outer sides of the bowl may slope at a selected angle from the vertical of about 5 to 40°, more preferably 5 to 20°, and still more preferably 15 to 20°.

The inner sides of the trough may slope inwardly at an angle from the vertical that varies around the circumference of the oval, with a steeper slope on the sides of the oval and a shallower slope on the ends of the oval. The inner sides preferably form smooth tangents to the curved bottom of the bowl, thereby eliminating internal corners in the trough.

The inward slope on the sides of the oval may range from about 10 to about 30° from vertical, and the inward slope on the ends of the oval may range from about 20 to about 50° from vertical.

The cantilevered handle may have a generally concave upper surface and a generally convex lower surface.

The handle may further contain a hole or hook for hanging the bowl when not in use.

The bowl may be made of a selected polymer. The polymer may be a thermoplastic or a thermoset and may further include dyes, organic fillers, and inorganic fillers. It may be fabricated by any suitable process, including injection molding, resin transfer molding, casting, machining, and 3D printing.

The outer sides of the bowl may contain a raised boss for engraving, personalizing, or the attachment of decorative elements.

The underside of the bowl may be substantially solid or it may be substantially hollow, provided that enough material is present to provide adequate structural rigidity. The underside of the bowl may further contain a plurality of elastomeric feet, or a continuous elastomeric ring, having a selected coefficient of friction to reduce sliding when the bowl is placed on a smooth surface.

If the underside of the bowl is hollow, the outer sides of the bowl may contain small openings to allow wash water to drain from the hollow area when the bowl is placed face down.

A supporting structure may be provided into which one or more bowls may be placed and held securely at a selected height above the ground, with the bowls held apart by a sufficient distance that the animal's ears will not contact the contents of one bowl while the animal is consuming the contents of the other bowl.

According to another aspect of the invention, a method for feeding a selected animal comprises the steps of:

providing a bowl including a trough having a rounded bottom and a generally oval shape whose minor axis is less than the distance between the selected animal's ears, and whose major axis is at least 125% of the minor axis, the bowl further comprising a cantilevered handle extending from the outer surface of the bowl along the major axis of the bowl;

placing material to be consumed by the animal into the trough;

placing the bowl onto a flat surface proximate to a selected vertical surface with the long axis of the oval substantially perpendicular to the vertical surface and the cantilevered handle extending in the direction away from the vertical surface so that the animal will approach the bowl from the direction of the cantilevered handle.

The bowl may be personalized by adding a snappable insert, which might bear a logo of, e.g., a sports team, university, military unit, or other affinity group. The insert may comprise a transparent plastic cover; waterproof adhesive labels may be prepared from user-supplied image files by laser printing the images onto label stock that is die cut to fit in the space under the snappable insert.

I claim:

1. A container for holding food or water for an animal comprising:

a unitary vessel having an elliptical plan and further comprising:

a trough in the upper surface of said vessel to contain material for consumption by an animal, said trough having a concave bottom and wherein the surface of said trough forms a smooth tangent to said concave bottom in order to eliminate internal corners;

a flat rim on the lower surface of said vessel to allow said vessel to rest stably on a horizontal surface;

an outer surface that slopes outwardly from said upper surface to said lower surface at a first selected angle $\theta_1$ from a vertical so that the area of said lower surface is greater than the area of said upper surface wherein the vertical is defined as a direction normal to the flat bottom of said container; and, an elongated cantilevered handle extending from the upper surface in a direction along the major axis of said ellipse and having sufficient dimensions and sufficient strength to support the weight of said vessel and its contents; and wherein, the surface of said trough slopes inwardly from the upper edge of said trough to said rounded bottom of said trough at an angle from the vertical that varies around the circumference of said ellipse, with a steeper slope $\theta_3$ on the sides of said ellipse and a shallower slope $\theta_2$ on the ends of said ellipse; and, said trough, excluding said handle, has an elliptical plan with an aspect ratio from about 125% to about 200%.

2. The container of claim 1 wherein said inward slope on the side of said ellipse is about 10° to about 30° from the vertical, and said inward slope on the end of said ellipse is about 20° to about 50° from the vertical.

3. The container of claim 1 wherein said outer surface slopes outwardly at an angle from the vertical of about 5° to about 40°.

4. The container of claim 1 wherein said cantilevered handle has a concave upper surface and a convex lower surface.

5. The container of claim 1 wherein said container comprises an injection molded thermoplastic polymer.

6. The container of claim 1 further comprising a hollow space between said trough and said outer surface.

7. The container of claim 6 further comprising a component on the lower surface to minimize slippage on smooth surfaces, said component selected from the group consisting of:

non-slip rubber feet;

segments of slit elastomeric tubing; and, a substantially continuous elastomeric U-ring disposed around the periphery of said lower surface.

8. The container of claim 1 further comprising an insert for personalized decoration.

9. The container of claim 8 wherein said insert comprises a badge with a selected image printed thereon and configured to snap into a corresponding depression on said outer surface of said container.

10. The container of claim 8 wherein said insert comprises:

a transparent plastic window configured to snap into a corresponding depression on said outer surface of said container; and, a label with a selected image printed thereon and cut to the size and shape of said depression so that said label may be placed into said depression and then covered by said transparent window.

* * * * *